Patented Sept. 26, 1939

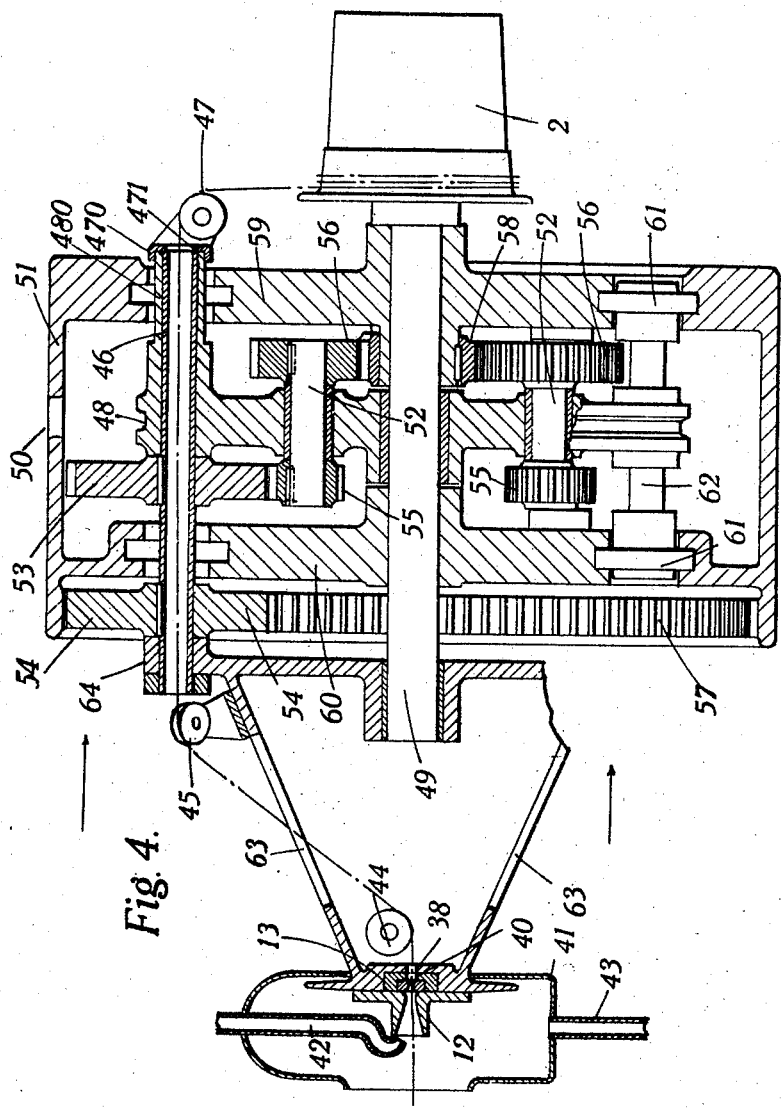

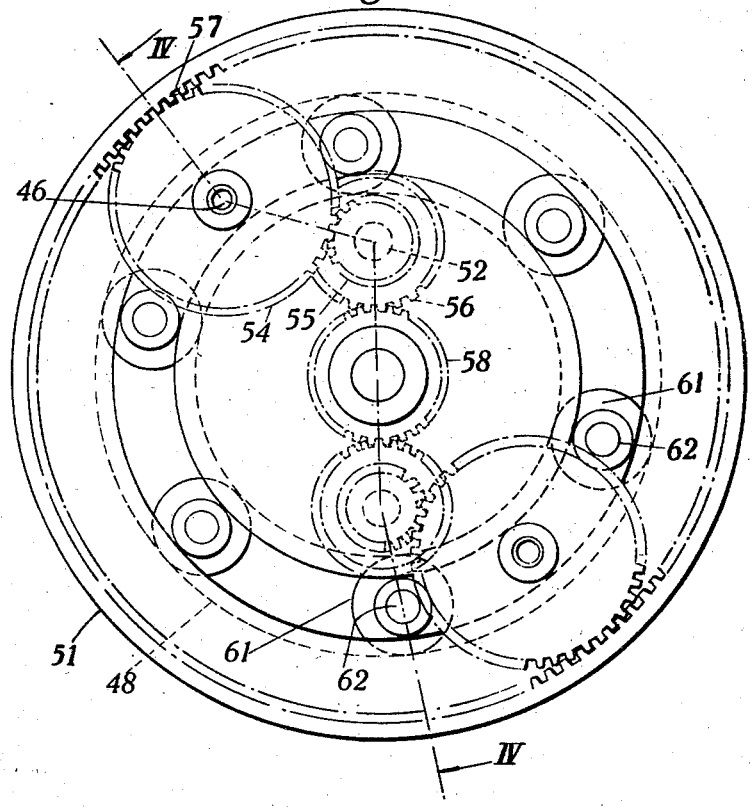

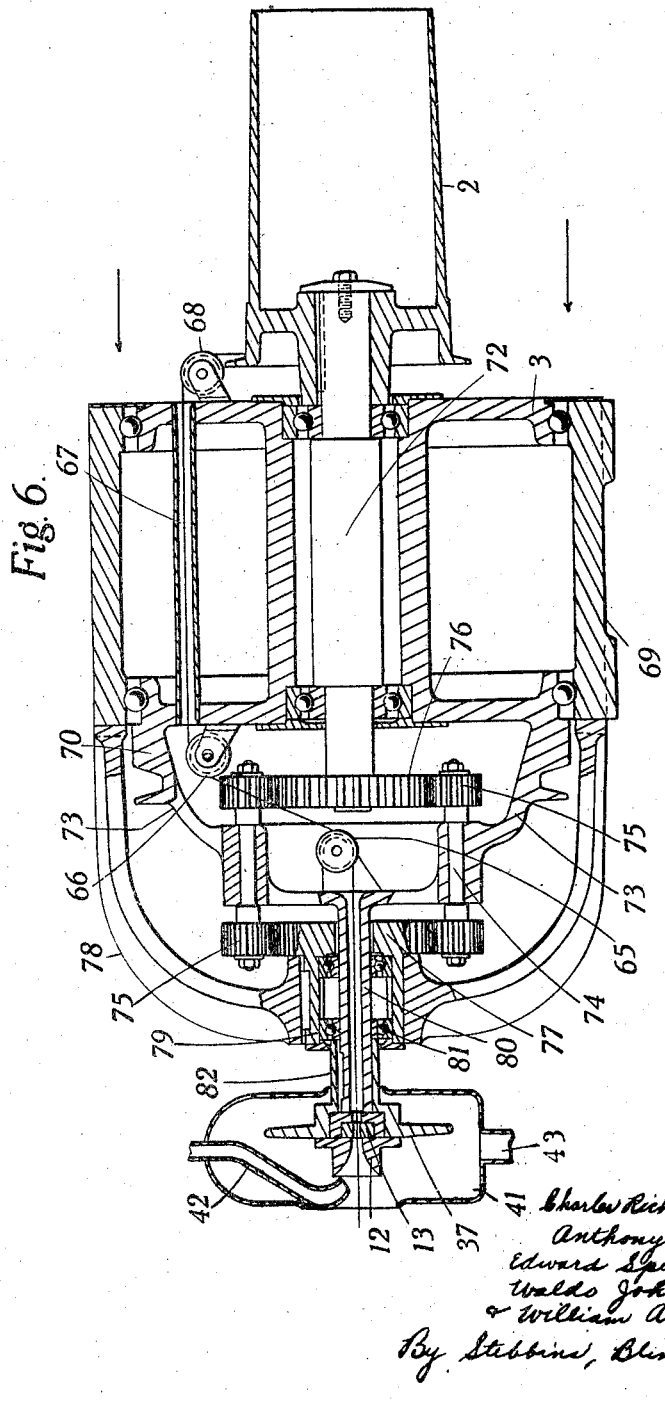

2,174,376

UNITED STATES PATENT OFFICE 2,174,376

WIRE WINDING APPARATUS

Charles Richard Bolton, Wavertree, Liverpool, Anthony Lawrenson, Eccleston, Edward Spencer Hargreaves, Rainhill, and Waldo John Clements and William Austin Brown, Eccleston Park, Prescot, England, assignors to British Insulated Cables Limited, Prescot, Lancashire, England, a British company Application June 8, 1937, Serial No. 147,122
In Great Britain June 12, 1936

10 Claims. (Cl. 205—16)

For winding wire and other long flexible articles (hereinafter for convenience referred to as "wire") on a block, spool, drum or other support (hereinafter referred to as "block" for convenience) there are two principal methods available. The more usual method is to lead the wire in a direction generally at right angles to the axis of the block and to rotate the block about this axis so as to draw the wire on and wind it round the block. The other method is to lead the wire in a direction which is generally parallel with the axis of the block, to hold the block stationary and to carry that part of the wire which is directly adjacent to the block in a circle about the axis of the block and outside the periphery of the block; by this movement the wire is laid on to the surface of the block.

The latter method has the advantage over the former that it does not require the stopping of the feed to the block (that is the take-up by the block) when the accumulated wire has to be removed from the block. This wire can be taken off at one end of the block while the further supply is being laid on at the other end. The method, however, has the disadvantage that the effect of winding the wire on to the stationary block is to put a twist into the wire. The result of this is that the wire does not lie dead or inert upon the block but tends to spring away therefrom so that the coils of wire on the block do not lie closely and evenly upon the block. An object of the present invention is to provide a construction of winding machine in which the above mentioned disadvantage is avoided.

In a machine for winding wire on to a stationary block, according to the present invention, the wire is brought into the machine at a point on a continuation of the axis of the block and it is then deflected away from this axis and is carried in a circular path round the axis of the block, and before the wire is deflected away from the axis of the block, it is drawn through a rotatably mounted die which is coaxial with the stationary block. This die rotates with the winding mechanism and serves to nullify the effect of the twist put into the wire as it is approaching the machine. Between the die and the place at which the wire is wound on to the block, the wire is carried round bodily without twist. The die, preferably, is placed at the extreme end of the machine so as to be clear of the rest of the mechanism and readily accessible for lubrication. It has been found that it is essential to lubricate the die as the wire passes through it as otherwise the length of life of the die, although the draft may be comparatively slight, is very short. Owing to the fact that the die is placed on the axis of the block, it can be readily lubricated in spite of the fact that it is rotating.

The invention will be further described with the aid of the accompanying drawings, which show different constructions of the kind in which the wire is wound on a block which is held stationary by a fixed ring which is coaxial with the block and through which the wire travels, and a transmitting gear of the sun and planet type working between the fixed ring and the block.

Figure 4 is a sectional elevation on the line IV—IV of Figure 5, showing a modified form of construction, and Figure 5 is an end elevation, looking in the direction of the arrows shown in Figure 4, but with some parts omitted.

Figures 6 and 7 show a further modification, Figure 6 being a side elevation in section, and Figure 7 an end elevation looking in the direction of the arrows shown in Figure 6.

Figure 1:
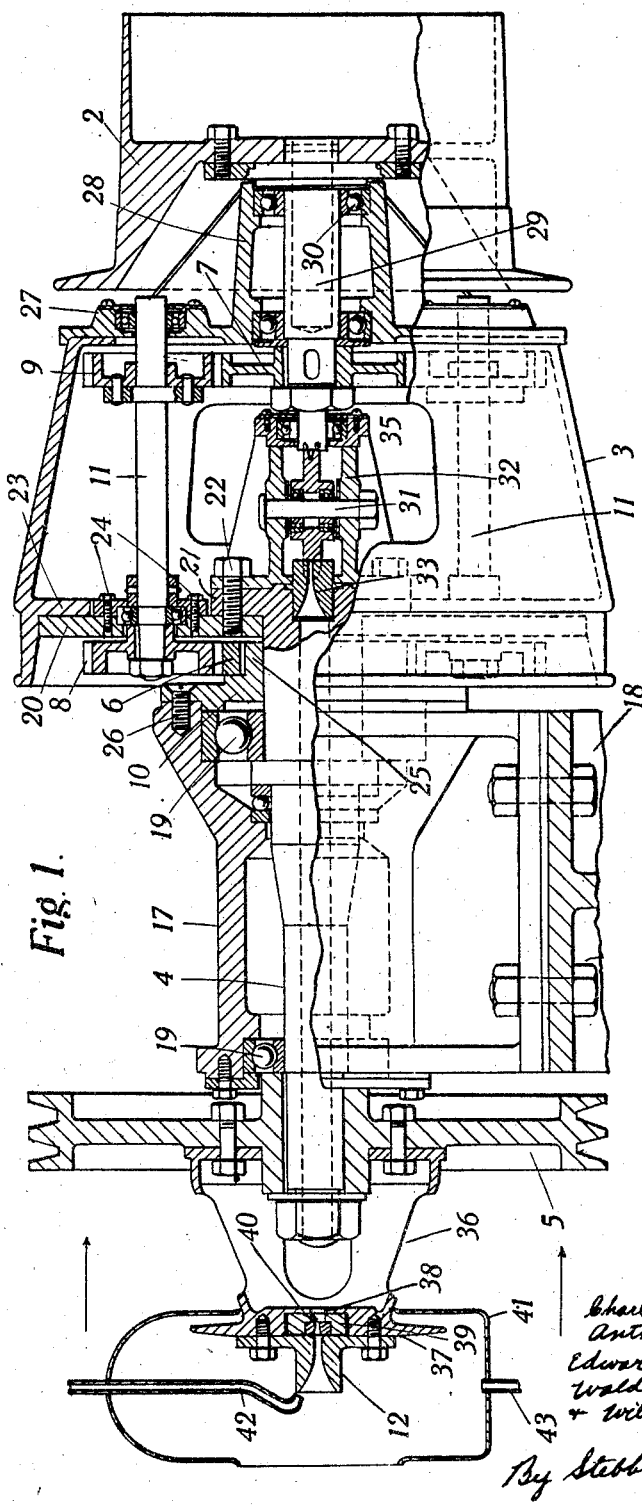
Figure 1 is a side elevation, partly in section, of one form of construction, the section being taken on the line I—I of Figure 2.
Figure 2:
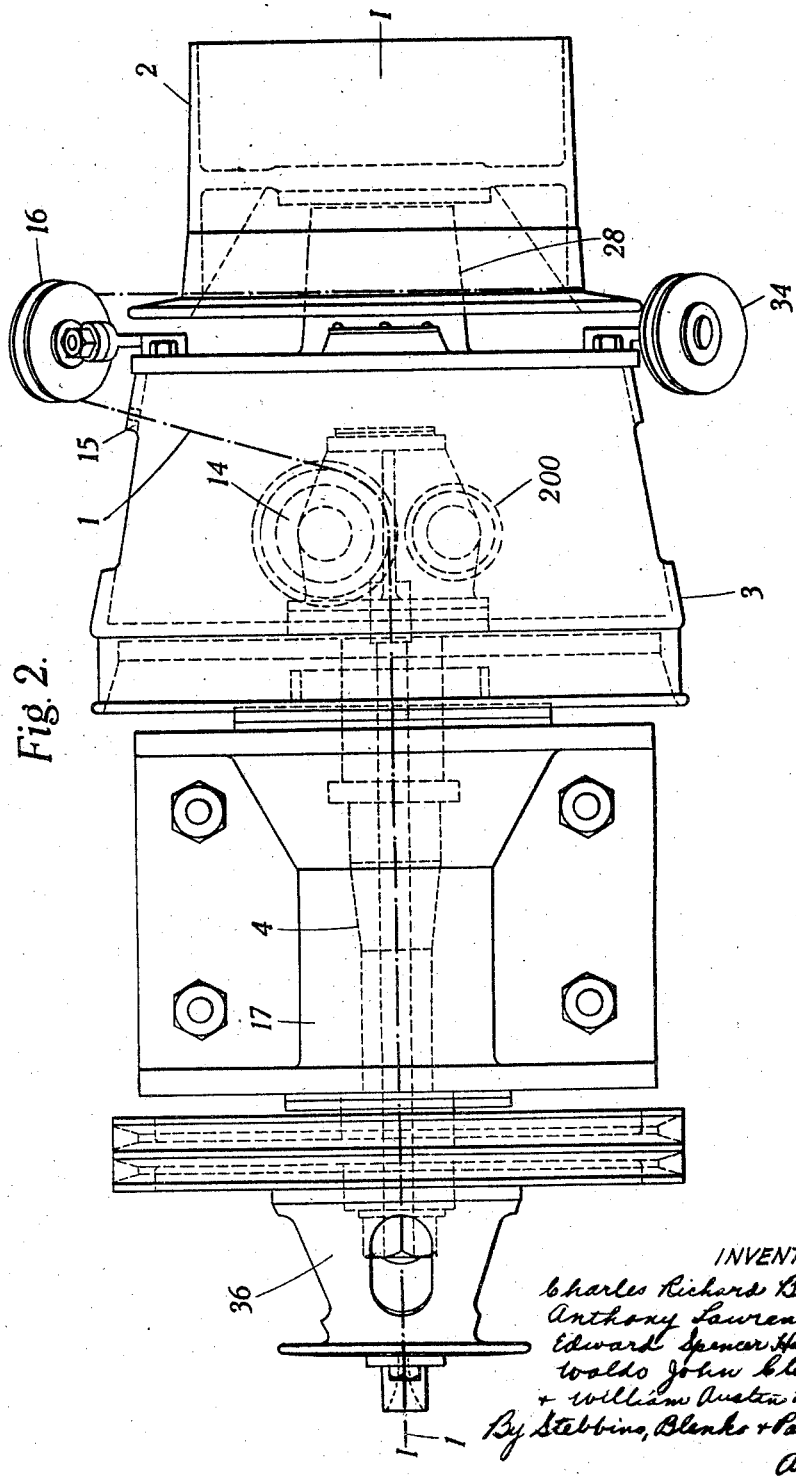
Figure 2 is a plan view of Figure 1.
Figure 3:
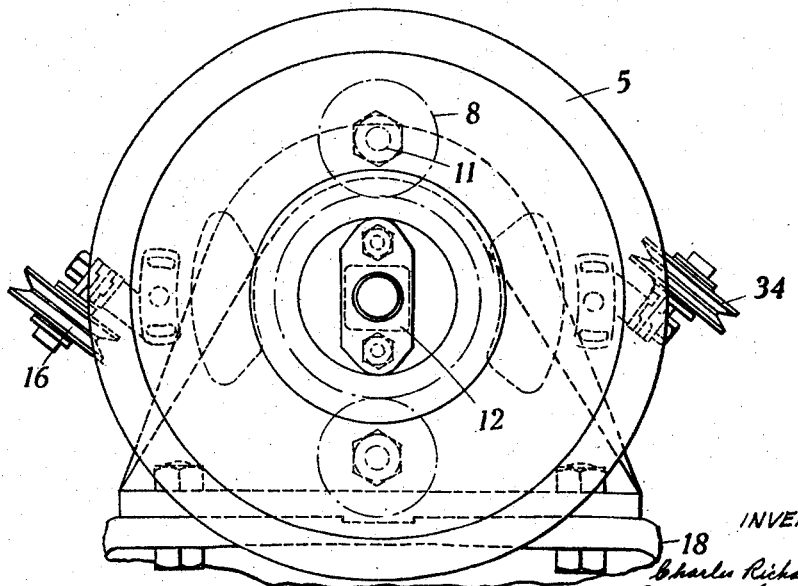
Figure 3 is an end elevation, looking in the direction of the arrows shown in Figure 1, but with some parts omitted.

Referring to Figures 1–3, the wire, the path of which is shown by dot and chain line 1 in Figure 2, is carried in a circular path about the axis of a stationary block 2 and is wound on to the block by a rotatable winding member formed by a guide pulley 16 mounted on a carrier 3. The latter is driven from a rotatable hollow shaft 4 provided with a pulley wheel 5 which is driven from any convenient source of power. The block 2 is held stationary by sun and planet gearing comprising sun wheels 6 and 7 and planet pinions 8 and 9, the sun wheel 6 being fixed to a fixed ring 10 and the sun wheel 7 being fixed to the block 2. The planet pinions are mounted on a spindle 11 having its longitudinal axis disposed parallel with the axis of the block 2, and mounted in the carrier 3.

The hollow shaft 4, carrier 3 and block 2 are coaxially arranged and the laying of the wire on to the block by the rotation of the carrier 3 and guide pulley 16 draws the wire through the machine from the left-hand end thereof to the right-hand end in the views shown in Figures 1 and 2. At the left-hand end of the machine there are disposed a guide 12 and a die 13 which are driven from the pulley wheel 5, the guide and die being coaxial with the shaft 4, carrier 3 and block 2. The wire is drawn through the guide 12, die 13, hollow shaft 4 and it then passes round a guide pulley 14 and out through an aperture 15 in the carrier to the guide pulley 16 fixed to the carrier and from the guide pulley 16, the wire passes on to the block 2.

It will be seen from Figure 2 that the path of the wire from the guide 12 to the guide pulley 14 is along the continuation of the axis of the block 2 and that at the guide pulley 14 the wire is deflected from this axis passing out to the exterior of the carrier and around the guide pulley or winding member 16 which is so positioned as to lead the wire on the block 2 in a direction which is at right angles to the longitudinal axis of the block.

The machine is supported in a fixed housing 17 which is bolted to a frame 18, a portion only of which is shown. The hollow shaft 4 passes through the housing 17 and is supported on ball bearings 19 in the housing. At its outer end the shaft 4 has mounted on it the pulley wheel 5 which is keyed to the shaft and the drive from the shaft is transmitted to the carrier 3 by a plate 20 fixed to the shaft 4. The latter passes through a central aperture in the plate 20 and has a flange 21 at its inner end and the plate and shaft are secured to each other by bolts 22. The plate 20 is secured to an internal web 23 on the carrier 3 by bolts 24.

In the construction being described the carrier 3 has the form of a drum or frame which houses the sun and planet gearing which permits rotation of the drum but holds the block 2 stationary. The drum also houses the guide pulley 14. As the carrier rotates about the axis of the block 2, the sun wheels 6 and 7 remain stationary and the planet pinions 8 and 9 are carried round the axis of the block and they also rotate on their own axes. The sun wheel 6 is held stationary by being keyed to a boss 25 on the ring 10. The latter is fixed to the housing 1 by screws 26 and the shaft 4 passes through the ring.

The planet spindle 11 to which the planet pinions 8 and 9 are fixed is mounted in ball bearings in the web 23, plate 20 and in an end plate 27 having an outwardly extending boss 28. The end plate 27 is fixed to the carrier and the boss 28 serves to support a shaft 29 fixed to the clock 2. The boss is coaxial with the block and as the carrier 3 rotates the boss 28 rotates round the shaft 29 which remains stationary. Ball bearings 30 are provided between the boss and the shaft.

The sun wheel 7 is keyed to the shaft 29 and when the carrier 3 is being driven from the shaft 4, the planet pinions 8 and 9 run round the sun wheels 6 and 7 and as the sun wheel 6 is fixed, the sun wheel 7 will be held stationary so that the shaft 29 and the block 2 will also be held stationary.

The guide pulley 14 is fixed to the hollow shaft 4 and rotates with it. For this purpose the guide pulley is mounted in ball bearings on a spindle 31 which passes through apertures in a casing 32 fixed to the flange 21 of the shaft 4. The casing 32 is flanged and is fixed to the flange 21 by the bolts 22. The wire is led on to the guide pulley 14 through a guide 33 which is placed adjacent to the guide pulley and has its axis coincident with the axes of the hollow shaft 4 and of the block 2. The guide 33 is held in place between the end of the shaft 4 and the casing 32.

It will be seen from Figure 2 that the guide pulley 14 is disposed so that the axes of the shaft 4 and block 2 form a tangent to the periphery of the guide pulley, the axis of the latter being off the axes of shaft 4 and block 2. In order to balance the effect of centrifugal force produced by this out of balance arrangement, the casing 32 has a counterweight 200 fixed to it. For the same reason the carrier 3 has a counterweight 34 fixed to it in order to balance the second guide pulley 16. The counterweight 34, conveniently, is another pulley similar to the guide pulley 16.

Openings 35 in the carrier 3 provide accessibility to the guide pulley 14, the casing 32 being open to permit the wire to be drawn through the guide 33, round the guide pulley 14 and taken out through the aperture 15 in the carrier 3.

The pulley wheel 5 is keyed to the end of the hollow shaft 4 and an overhung bracket 36 is bolted to the pulley wheel 5, the bracket terminating in a plate 37 to which is bolted the guide 12. The plate 37 has a centrally disposed opening 38 and a recess which receives a holder 39 for the die 13. The holder has a centrally disposed aperture 40 and the longitudinal axes of the guide 12, die 13 and openings 38 and 40 are coincident with those of the hollow shaft 4 and block 2.

The die 13 is fixed to the holder 39 and the latter to the plate 37 which forms the end of the bracket 36, and as the latter is bolted to the pulley wheel 5, it will be appreciated that as the pulley wheel is driven, the die 13 rotates with it and rotates the wire as the latter is drawn through the die. As explained above, the effect of winding the wire on to the block 2 is to put a twist in it but by employing a die which is caused to rotate with the carrier 3 for the wire and arranging the die coaxially of the block and such that the wire is drawn through the die before it is deflected away from the axis of the block, the effect of the twist in the wire is nullified as the wire is approaching the machine, the wire being carried round bodily without twist, between the die 13 and the place where it is laid on to the block 2.

The bracket 36 provides a support for the die 13 and is carried from the outer end of the hollow rotatable shaft 4 and projects outwards from the end of the machine. This arrangement is particularly advantageous from the point of view of lubrication. As explained above the life of the die is very short unless it is lubricated and the arrangement described permits the die to be readily lubricated. Figure 1 shows that a very simple arrangement for this purpose may be adopted. In that figure, the plate 37 and the parts associated therewith are shown housed in a fixed casing 41 or inclosure having an aperture at its upper end to receive a pipe 42 terminating at the mouth of the guide 12. Lubricating liquid is supplied to the pipe 42 and led from the casing 41 through an outlet pipe 43 placed at the bottom of the casing. The projecting bracket 36 permits the fixed casing 41 to be placed well clear of the rest of the machine.

A further advantage resulting from the construction described above is that it may be used for high speed winding as there are no appreciable out of balanced forces, the carrier 3 being in the form of a drum providing a symmetrical arrangement and the guide pulleys being balanced respectively by the counterweights 200 and 34. The planet spindle 11 and the parts carried thereby are duplicated as shown by chain lines in Figure 1 in order to balance the effects of centrifugal force produced by these rotating parts. The formation of the carrier as a drum which houses the sun and planet gearing and guide pulley 14 also has the advantage of providing a compact construction and avoids rotating parts which project and which might cause injury to operatives unless enclosed by specially constructed cages.

In the construction shown in Figures 4 and 5, the wire is drawn through a rotating die 13, around guide pulleys 44 and 45, through a hollow spindle 46 and around a guide pulley or winding member 47 on to a stationary block 2. The wire is wound on to the block by the rotation of the hollow spindle 46 around the axis of the block. For this purpose a pulley 48 is mounted free to rotate upon a shaft 49, the longitudinal axis of which is coincident with that of the block 2. The pulley 48 is driven by any suitable means, for example, by a belt (not shown) which passes through an opening 50 in the wall of a fixed casing 51. The pulley 48 carries the hollow spindle 46 and a spindle 52 and both spindles are free to rotate about their own axes. As will be seen from Figure 5 the axes of the spindles 46 and 52 lie on different radii of the pulley 48. Gear wheels 53 and 54 are keyed to the spindle 46, and gear wheels 55 and 56 are keyed to the spindle 52. The wheel 54 meshes with an internally toothed ring or sun wheel 57 which forms part of the fixed casing 51. The wheel 53 meshes with the wheel 55 and the planet wheel 56, with a sun wheel 58 which is keyed to a disc 59 mounted on the shaft 49. The block 2 is carried by the disc 59.

When the pulley 48 is driven, the two spindles 46 and 52 are caused to rotate about the axis of the shaft 49 and the planet wheel 54 is carried round the ring or sun wheel 57 and caused to rotate on its own axis. The wheels 54 and 53 are fixed to the spindle 46 so that the rotation of the planet wheel 54 is transmitted to the wheel 53 and the latter drives the wheels 55 and 56 about the axis of the spindle 52. The internally toothed ring 57, wheels 54, 53, 55, 56 and 58 are so proportioned that the sun wheel 58 is not driven about its own axis but remains stationary, the planet wheel 56 being merely carried round it. As the sun wheel 58 remains stationary, the disc 59 and the block 2 will also remain stationary.

In the construction just described, the carrier for the wire comprises the pulley 48 which carries the two spindles 46 and 52. The carrier is supported in the fixed casing 51 by the disc 59 and by a second disc 60 which is also mounted on the shaft 49. The peripheries of the discs 59 and 60 are provided with grooves and the wall of the fixed casing 51 on its inner face is also provided with grooves. The grooves in the fixed casing and in the discs receive rollers 61 which are mounted on a spindle 62 carried by the pulley 48 so that the whole of the structure within the casing 51 is supported and guided by the casing. There are six spindles 62 spaced approximately 60° apart and each carrying a pair of rollers.

The guide pulley 47 is carried by a bracket 470 which is fixed to the end of a boss 480 with which the pulley 48 is provided. An aperture 471 in the bracket 470 provides for the passage of the wire through the spindle 46 to the guide pulley 47.

The guide pulleys 44 and 45 are fixed to a bracket 63 which is carried by the spindle 46 and extends well out from the fixed casing 51. The spindle 46 is free to rotate on its own axis relatively to the bracket 63. The rotatable die 13 is carried by the bracket 63 and rotates therewith. In order to avoid unbalanced forces, the unsymmetrically arranged rotating parts, including the hollow spindle 46, are duplicated, and the bracket 63 is provided with bosses 64 through which pass the ends of spindle 46.

The guide pulley 44 which is mounted in the bracket 63 is disposed off the longitudinal axes of the die 13 and of the block 2, and is so arranged that from the die to the guide pulley, the path of the wire is coincident with the axis of the pulley block 2 and is deflected from this axis at the guide pulley 44 and as it is drawn round that guide pulley to the guide pulley 45. From the latter guide pulley to the last guide pulley or winding member 47, the path of the wire is parallel to the axis of the block 2. The path of the wire is indicated by dot and chain lines in Figure 4.

The construction and arrangement of the rotatable die 13 which is mounted on the bracket 63 is the same as that shown in Figure 1 and will not, therefore, be further described.

In the construction just described the guide pulley or winding member 47 is carried by the pulley 48 which forms a support for the planet wheels 54 and 56, and the rollers 61 provide bearings for the pulley 48 as the latter rotates within the stationary casing 51. As will be seen from Figure 4, the pulley 48 has a bearing for the shaft 49 which carries the block 2. The shaft 49 projects beyond the pulley 48 and at one end carries the block 2, and at the other end enters a boss on the bracket 63 which carries the die 13 and projects outwards from one end of the stationary casing 51.

The advantages as regards nullifying the effect of twist in the wire, ease of lubrication, capacity for high speed operation and general compactness, apply to the construction shown in Figures 4 and 5 as well as to that shown in Figures 1–3.

Figure 7:
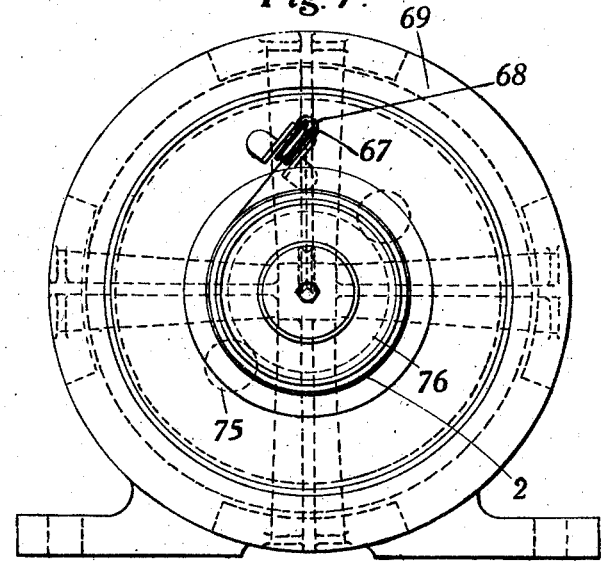

In the construction shown in Figures 6 and 7, the wire is drawn on to a stationary block 2 through a rotatable die 13, round guide pulleys 65 and 66, through a tube 67, and round a guide pulley 68 on to the block. The tube 67 is mounted in a carrier 3 mounted in ball bearings inside a fixed casing 69. The carrier has the form of a drum and has a projecting flange 70 which is grooved to receive a belt which serves to rotate the carrier within the fixed casing 69. The carrier is mounted on ball bearings on a stationary shaft 72 to which the block 2 is keyed. The guide pulleys 66 and 68 are mounted on the carrier and rotate with it.

The projecting flange 70 is continued as a bracket 73 in which are mounted planet spindles 74 having planet pinions 75. The block 2 is held stationary by a sun wheel 76 which is fixed to one end of the shaft 72 and by a second sun wheel 77 which is fixed to an overhung bracket 78 forming part of the fixed casing 69. For this purpose, the sun wheel 77 has a boss 79 which passes through a centrally disposed aperture in the bracket 78 and is keyed to the bracket. The bracket 73 has a long hollow sleeve-like boss 80 which passes through a central hole in the sun wheel 77 and through the boss 79 and extends for some distance beyond the bracket 78, ball bearings 81 being placed between the bosses 79 and 80. A plate 37 housing a die 13 has a boss 82 which encloses the end of the boss 80 and is keyed to it. It will be understood that as the bracket or planet pinion carrier 73 rotates, the boss 80 and the die 13 rotate with it. The boss 80 and die 13 are disposed coaxially of the shaft 72 and block 2. The construction and arrangement of the die are the same as those shown in Figure 1.

The path of the wire from the guide 12 to the guide pulley 65 is coincident with the axis of the block 2, the wire being deflected from this path at the guide pulley 65. From the pulley 66 to the pulley 68, the path of the wire is parallel with the axis of the block 2.

The carrier 3 is rotated within the fixed casing 69 so as to cause the planet pinions 75 to run round the sun wheels 76 and 77, this rotary motion being transmitted to the die 13. The rotary motion of the carrier 3 winds the wire on to the block 2. During this motion the block 2, shaft 72, sun wheels 76 and 77 remain stationary.

The construction just described has the same advantages as those stated in connection with Figures 1-5.

The guide pulleys 66 and 68 may be duplicated in order to avoid unbalanced forces.

What we claim as our invention is:

1. A machine for winding wire comprising a bearing, a rotatable hollow shaft supported in the bearing and extending beyond each end thereof, a driving member fixed adjacent one end of the shaft, a bracket fixed to the driving member, a die for gripping and rotating the wire carried by the bracket and rotatable therewith, an end plate fixed to the bearing adjacent the other end of the shaft, a rotary drum fixed to the shaft, an end plate fixed to the drum, a boss on the end plate, a shaft supported by the boss, a stationary block fixed to one end of the shaft, sun wheels fixed respectively to the end plate carried by the bearing and to the other end of the shaft supported by the boss, a spindle carried by the drum, planet wheels mounted on the spindle each meshing with a sun wheel, a winding member carried by the drum for winding the wire on to the block, a guide member rotatable with the drum for leading the wire, after it has been drawn through the die and hollow shaft, through an aperture in the drum to the winding member, the sun and planet gearing and the guide member being housed within the drum and the axes of the die and hollow shaft being coincident with the axis of the block.

2. A machine for winding wire comprising a block, means for holding the block stationary, a winding member for carrying the wire in a circular path around the block and winding it thereon, a die for gripping and rotating the wire and rotatable with the winding member and disposed coaxially of the block, and a guide for leading the wire outward from a point on the axis of the block to the winding member.

3. A machine for winding wire comprising a block at one end of the machine, means for holding the block stationary, a winding member for carrying the wire in a circular path around the block and winding it thereon, a die disposed at the other end of the machine for gripping and rotating the wire and rotatable with the winding member and coaxial with respect to the block, and guiding means for the wire intermediate the block and the die for leading the wire from a point on the axis of the block outward to the winding member.

4. A machine for winding wire comprising a block, means for holding the block stationary, a winding member for carrying the wire in a circular path around the block and winding it thereon, a die rotatable with the winding member for gripping and rotating the wire and disposed coaxially of the block, a support for the die rotatable with the winding member and projecting outwards from the end of the machine, a stationary lubricating casing enclosing the die, and guiding means for leading the wire from a point on the axis of the block outward to the winding member.

5. A machine for winding wire comprising a block, a bearing, a hollow rotatable shaft in the bearing, coaxial of the block, a die for gripping and rotating the wire also coaxial of the block and carried at the outer end of the shaft, a housing carried at the inner end of the shaft and supporting the block, sun and planet gearing within the housing for holding the block stationary, and a winding member carried by the housing for carrying the wire round the block and winding it thereon, and guiding means for leading the wire from a point on the axis of the block outward to the winding member, the latter drawing the wire through the die, the hollow shaft and around the guiding means as the winding member moves round the block.

6. A machine for winding wire comprising a stationary casing, bearings in the casing, a rotatable support mounted in the bearings, a winding member carried by the support, a bearing in the support, a shaft mounted in the bearing and projecting beyond the support, a block fixed to the projecting part of the shaft, sun wheels connected with the said casing and block, planet wheels carried by the support, a bracket rotatable with the support and the winding member, projecting from the end of the stationary casing remote from the block, a die for gripping and rotating the wire mounted in said bracket and rotatable therewith and disposed coaxially of the block, and means for guiding the wire from the die to the winding member.

7. A machine for winding wire comprising a stationary casing, bearings in the casing, a rotatable support mounted in the bearings, a winding member carried by the support, a bearing in the support, a shaft mounted in the bearing and projecting beyond the support, a block fixed to the projecting part of the shaft, a ring of teeth on the inner surface of the stationary casing forming a fixed sun wheel, a second sun wheel connected with the block, planet wheels carried by the support co-operating with the sun wheels, the sun and planet wheels being housed within the stationary casing, a bracket rotatable with the support projecting from the end of the stationary casing remote from the block, a die for gripping and rotating the wire rotatable with the bracket and disposed co-axially of the block, and means for guiding the wire from the die to the winding member.

8. A machine for winding wire comprising a stationary casing, a pair of discs co-operating with the casing to form bearings, a rotatable support adapted to be driven mounted in said bearings, a shaft passing through the support and extending beyond the discs, a block connected to the shaft, a hollow spindle carried by the support, a winding member rotatable with the support for carrying the wire in a circular path around the axis of the block and for winding it thereon, a second spindle carried by the support, a pair of gear wheels fixed to the second spindle, a sun wheel connected with the block meshing with one of said gear wheels, a gear wheel fixed to the hollow spindle meshing with the other of said gear wheels, a second sun wheel formed by an internal ring of teeth on the stationary casing, a gear wheel meshing with said second sun wheel and fixed to the hollow spindle, a bracket projecting from the end of the casing remote from the block, rotatable with the support, a die for gripping and rotating the wire mounted in the bracket and rotatable therewith, and disposed coaxial of the shaft and the block, and means for guiding the wire through the die and the hollow spindle to the winding member.

9. A machine for winding wire comprising a stationary casing, bearings in the casing, a rotatable support in the bearings, a shaft passing through the support, a block fixed to the shaft projecting from one side of the support, an extension bracket fixed to the stationary casing and projecting therefrom on the side remote from the block, a sun wheel fixed to the shaft, an externally toothed ring mounted on the extension bracket, and forming a second sun wheel, planet wheels carried by the support co-operating with the sun wheels, the sun and planet wheels being disposed within the extension bracket, a hollow sleeve projecting through the extension bracket and rotatable with the support, a die connected to and rotatable with the sleeve and disposed coaxially of the block, a winding member carried by the support for carrying the wire in a circular path around the axis of the block and for winding it thereon, and means for guiding the wire through the die for gripping and rotating the wire and sleeve to the winding member.

10. A machine for winding wire comprising a shaft, a block fixed to one end and a sun wheel fixed to the other end of the shaft, a support rotatably mounted on the shaft, a tubular member carried by the support, a winding member carried by the support and disposed adjacent the block, a guide also carried by the support and disposed adjacent the tubular member on the side remote from the block, a fixed outer casing having an aperture, an externally toothed ring forming a second sun wheel fixed to the extension bracket, a planet pinion bracket carried by the support, planet pinions mounted in the bracket meshing respectively with the sun wheel on the shaft and the externally toothed ring, the extension bracket housing the sun and planet gearing, a sleeve coaxial of the shaft and block and fixed to the planet pinion carrier and extending through the externally toothed ring and the aperture in the extension bracket, a die for gripping and rotating the wire fixed to the sleeve and rotatable therewith and disposed outside the extension bracket and coaxially of the sleeve, a shaft and block, and a guide for leading the wire, from the sleeve to the guide placed adjacent the tubular member, the wire being drawn through the die, the sleeve, and the tubular member to the winding member while the wire is being wound on to the block.

CHARLES RICHARD BOLTON.
ANTHONY LAWRENSON.
EDWARD SPENCER HARGREAVES.
WALDO JOHN CLEMENTS.
WILLIAM AUSTIN BROWN.